March 6, 1962 A. MATTICOLI 3,023,520
DEVICE TO MAINTAIN CONSTANTLY FOCUSED, IN A CENTERED
OPTICAL SYSTEM, OBJECT AND IMAGE DURING THE
VARIATION OF THE DISTANCES FROM THEIR
PLANES TO THE RESPECTIVE NODAL
POINTS OF THE LENS
Filed July 16, 1957 3 Sheets-Sheet 1
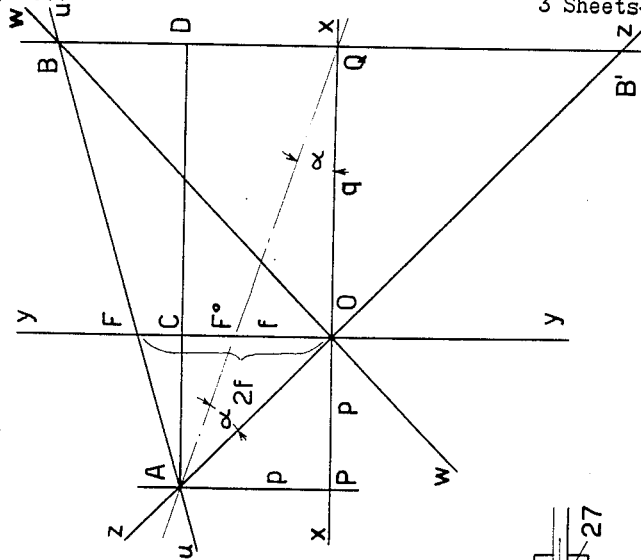
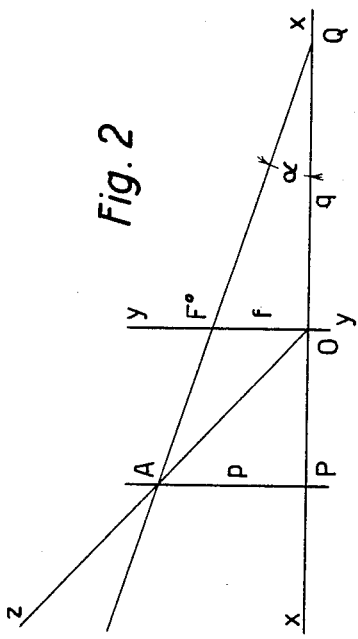
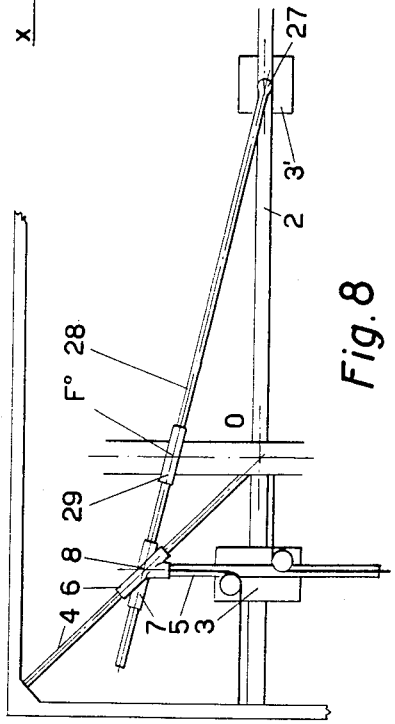
INVENTOR.
ALFREDO MATTICOLI
BY
Richards & Geier
ATTORNEYS

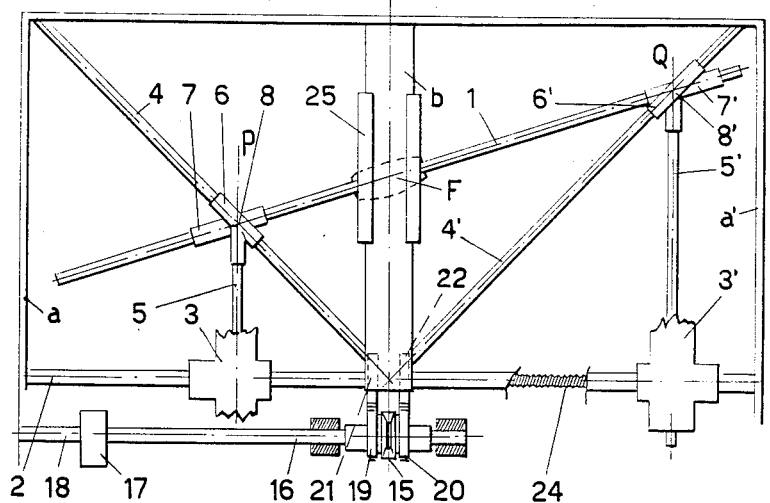
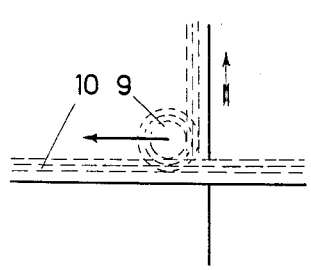
Fig. 5
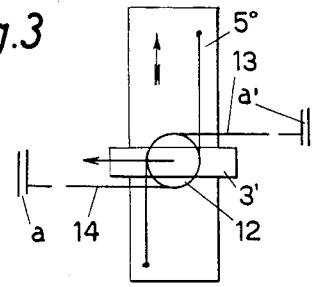
Fig. 6
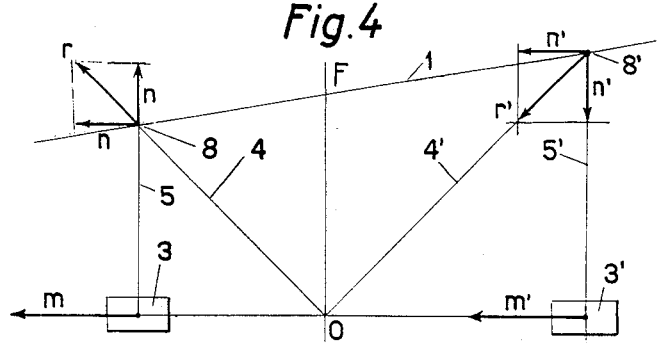
Fig. 4
INVENTOR.
ALFREDO MATTICOLI
BY Richards & Geier
ATTORNEYS

INVENTOR.
ALFREDO MATTICOLI 3,023,520
DEVICE TO MAINTAIN CONSTANTLY FOCUSED, IN A CENTERED OPTICAL SYSTEM, OBJECT AND IMAGE DURING THE VARIATION OF THE DISTANCES FROM THEIR PLANES TO THE RESPECTIVE NODAL POINTS OF THE LENS
Alfredo Matticoli, Rome, Italy
Filed July 16, 1957, Ser. No. 672,248
Claims priority, application Italy July 16, 1956
8 Claims. (Cl. 88—1)

It is known that in cinematography the films are reproduced and reduced from one to another size by the "tracking shot" method, i.e. by placing the film on a plane (object plane) and moving before it the image plane of the camera and the lens.

An empirically designed cam is generally used to keep the lens properly focused during the variations in distance between the object plane and the image plane.

The same method is used for the so-called trick shots, such as fade-in, fade-out and cross-fade.

For the shooting of live scenes, the method is substantially the same, because the camera is mounted on a truck which moves towards the scene or away from it, and the operator is responsible for maintaining the lens properly focused.

This invention, based on the analytical function of the conjugated points, not known officially to this date, places the two operations on the same plane and provides a single solution for both, preventing the serious drawback of the alteration of the perspective in the scene shot, and simplifying the equipment and improving the results.

The following description illustrates, as a non-limiting example, some forms of practical embodiment of the invention, with reference to the enclosed tables of drawings in which:

FIGS. 1 and 2 illustrate the geometrical part of the problem;

FIG. 3 shows the arrangement of the kinematic symmetric function of the conjugated planes, referred to the nodal plane of the camera lens, maintained in a fixed position;

FIG. 4 shows the resolution of the forces in the kinematic function of the elements;

FIGS. 5 and 6 show two practical solutions to the problem of maintaining a nodal point along the bisectrix of each of the straight angles of the Cartesian coordinates;

FIG. 8 represents, in outline form, a simplified variant of the kinematic function of the conjugated planes.

Figure 7:
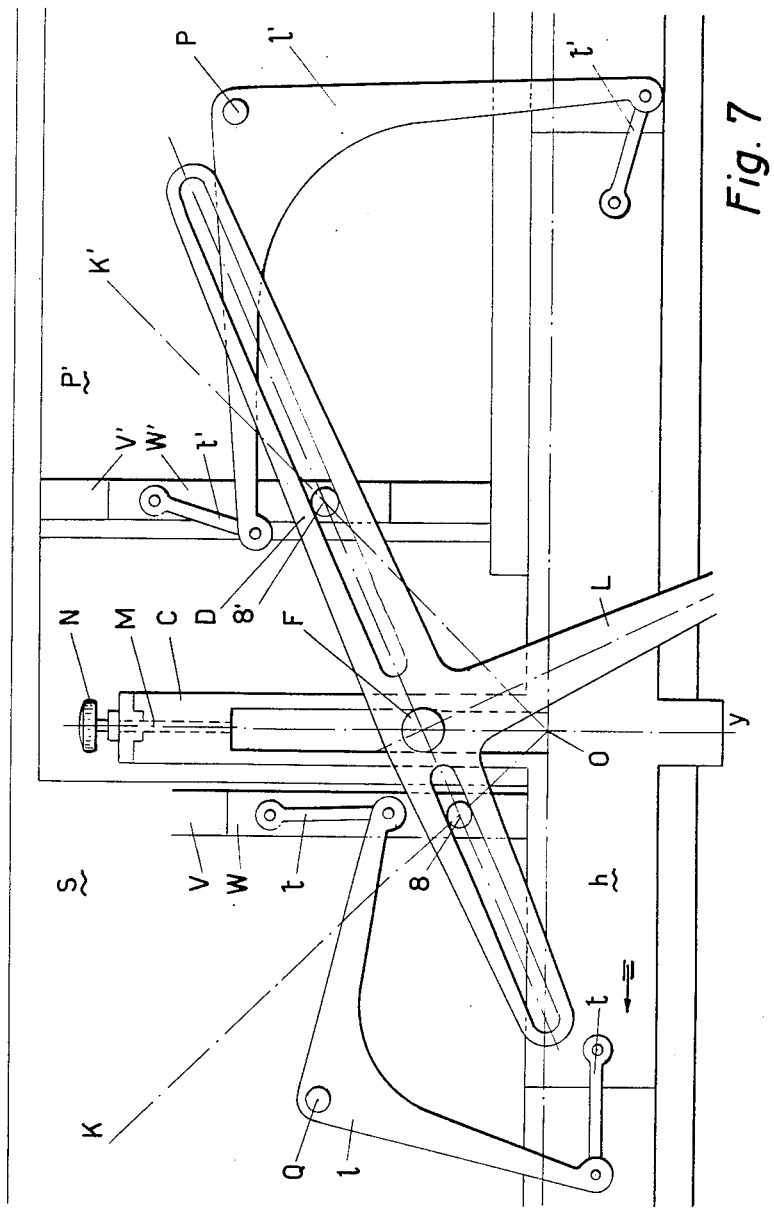
FIG. 7 shows the same arrangement as in FIG. 3 when, instead of keeping the camera fixed, one of the conjugated planes is kept fixed.

The basic law of geometrical optics is provided by the equation:

$$\frac{1}{f}=\frac{1}{p}+\frac{1}{q}$$

in which $f$ is a constant, while $p$ and $q$ represent the variable abscissae or ordinates of the conjugated points, one of which is on the object plane and the other on the image plane.

Let us now take (FIG. 1) a point F on the ordinate of a Cartesian plane of coordinates $x$ and $y$, at distance $2f$ from the original O, let us draw the two bisectrices $ww$ and $zz$ of the two adjacent right angles, and through F let us draw a straight line $uu$, intersecting the two bisectrices in A and B.

Since these two points are on the bisectrices of the right angles, their coordinates, which we will call respectively $p$ and $q$, are equal, and therefore $AP=AC=p$, and $BQ=OQ=q$. If in the two similar triangles AFC and ABD we substitute the values $2f$, $p$ and $q$, and we then take $AC=p$, $AD=p+q$, $FC=2f-p$ and $BD=q-p$, we find that:

$$p:(p+q)=(2f-p):(q-p)$$

from which:

$$p(q-p)=(p+q)(2f-p)$$

and finally:

$$pq-p^2=2fp+2fq-p^2-pq$$

$$2pq-2fp=2fq$$

and dividing the whole by $2fpq$:

$$\frac{1}{f}=\frac{1}{p}+\frac{1}{q}$$

which is the equation of the straight line of the conjugated points.

If $p=x$ and $q=x'$, the result is $$\frac{f}{x}+\frac{f}{x'}=1$$

which is the equation of the straight line of the conjugated foci.

Rotating the straight line $u$—$u$ around the point F, the coordinates of its intersections with the bisectrices vary with a continuous function, but always represent the distances of the conjugated points in the centered dioptrical system of focal length $f$. The point F changes, its distance from O changes and becomes $f'$, but the coordinates of the intersections with the bisectrices will always be the new distances of the conjugated points in the system of focal length $f'$.

Reciprocally, drawing line AQ (FIG. 1) and extending BQ till it meets $zz$ in B', AQ intersects FO in the point F° midway between F and O, i.e. at a distance $f$ from O, because Q is the mid-point between B and B', therefore also F° is the mid-point between F and O.

Similarly, if on a Cartesian plane we pick on $y$ (FIG. 2) a point F° at distance $f$ from the origin, and from a point Q picked arbitrarily on $x$ we draw QF°, its extension intersects the bisectrix OZ in a point A, whose coordinates are the distance of the conjugated point of Q in the system of focal length $f$.

In FIG. 3, which embodies the kinematic function of the geometrical principle set forth above, the guide rods 2 represent the abscissa of the Cartesian plane contained in the rigid frame $a$, while the support shaft $b$ passing through the point F represents the ordinate. Upon the shaft B slide the guides 25, which carry pivot F, constituting the fulcrum of the director rod 1.

The guides 25 may be moved by means of a screw N (FIG. 7), and be located at a distance from the axis of the rods 2 exactly equal to the focal length of the lens.

The supports 3 and 3', sliding on rods 2 by means of screw 24, driven as indicated below, mark, by means of the vertical parallel planes passing through the axis of the guides 5—5' fastened to them, respectively the conjugated planes P and Q, respectively being the object plane and the image plane.

The guides 4—4', instead, are fixed to the apparatus frame $a$, to which is also fastened the support $b$. The guides 4—4' are slanted at 45° and represent the bisectrices of the straight angles formed by the axes $x$ and $y$.

The sliding elements 6, 6', are located on either side of the support $b$ and composed of two rigid bushings at 45°, the axes of which meet in 8—8'. One of these bushings is slidable along the guides 5—5', the other along the guides 4—4', while a third bushing 7, 7', slidable along the director rod 1, is pivoted on the meeting points 8—8'.

FIG. 4 shows the resolution of two forces $m$—$m'$ exercised in the same sense on the two supports 3 and 3', which transmit the stress, by means of the guides 5 to the pivots 8, 8' and thence to the bushings 6, 6'. The latter, being connected to the rigid guides 4—4', are forced to slide along the latter with a force $r$ and $r'$, directed respectively upwards and downwards.

Each of these forces resolves into forces $n$—$n$ and $n'$—$n'$ at a straight angle and equal and therefore, if there were no impediment, while $n$—$n$ move upwards the pivot 8 along the guide 5 fastened to the support, the others move downwards the pivot 8' along the guide 5' fastened to the support 3'. But because of the presence of the director rod 1, along which slides bushing 7, the other component $n$ and $n'$ of the forces $r$ and $r'$ resolves in turn into two forces, one tending to rotate guide 1 around its fulcrum F, and the other to make pivots 8 and 8' slide along the same guide. But since guide 1 is stressed by the two components to rotate in the same direction, fulcrum 8 and 8' can slide simultaneously along guide rods 5 and 4, 5' and 4', in the space permitted by the rotation angle of director guide 1.

If friction is reduced to a minimum, and if a rotational motion is imparted upon director guide 1, the two supports 3 and 3' move in the direction and space fixed by the rotation of the director guide 1. If frictions are not negligible, the solution shown in FIG. 3 can be adopted, where a differential assembly whose satellite cage 15 is driven directly by driving shaft 18, rotates gears 21 and 22 fastened to the screws 24, both either right-handed or left-handed. By means of the respective threads, supports 3 and 3' move along the said screws, moving the director guide 1 by the angle permitted, and the conjugated planes P and Q move precisely in such a fashion that at any time the condition is satisfied as imposed by the basic law of geometrical optics:

$$\frac{1}{f}=\frac{1}{p}+\frac{1}{q}$$

But from the mechanical standpoint the fulcrum 8—8' must move, even though at different speeds, strictly along the two diagonal rods 4—4'. This can be obtained also in other manners, such as for instance by means of gear 9 (FIG. 5), which meshes with the right-angle racks 10 and 11. One rack is fastened to the horizontal fixed plane, the other fastened to a vertical plane vertically sliding on the horizontal fixed plane, or by means of a two-groove pulley 12 (FIG. 6) pivoted on a plane 3' sliding horizontally on a fixed frame $a$—$a'$. A plane 5° is slidable vertically on plane 3'. To the end of plane 5° is fastened the end of a flexible and inextensible wire 13, the other end of which is fastened to $a'$ after passing around pulley 12.

It is evident then that if the pulley pivot 12 is moved from right to left, plane 3' will move the same distance horizontally, while plane 5° will move the same distance vertically downwards. For this to happen with the left-to-right movement of the plane 3', a similar wire 14 is provided, passing in the other groove of pulley 12, and having one end fastened to the upper end of 5°, and the other to $a$.

Under these conditions, it is evident that each point of plane 5° will describe a straight line inclined at 45°.

In the example shown in FIGS. 1 and 3, we have considered the lens plane O to be fixed, and the planes passing through the conjugated points P and Q (i.e. through 8 and 8') to be movable. In the case shown in FIG. 7, we consider the plane passing through Q to be fixed.

Then the fulcrums Q and P of the two levers 1 and 1' are fixed, respectively, on plane S, which is the support of the object plane, and on plane P', which is the support for the image plane P.

Let us consider again the Cartesian plane, whose abscissae is represented by the horizontal arm of the crosspiece C which can slide along the abscissa parallel to the optical axis, guided on the support plane S. The other arm of the crosspiece, perpendicular to the first, carries the pivot F, movable by means of screw M controlled by knob N, so that its position from point O can be adjusted precisely equal to distance $2f$.

On support plane S there can also move, parallel to the abscissa and consequently parallel to the sheet of the drawing, a plane P'. On the parallel planes S and P' are provided two grooves V and V', parallel to the ordinate passing through F. In these grooves slide guides W and W', on which are fastened the pivots 8 and 8', engaged in the two portions of a slot provided in director bar D, pivoted at F and controlled by an arm L ending with a handle.

It is evident that, when arm L is moved, pivots 8 and 8' slide in opposite directions, with their supports, in the respective grooves V and V' provided in the planes S and P', where the two levers 1 and 1', having each equal and straight-angle arms, have their fulcrum in the same pivots Q and P. Each lever has one of the arm ends connected to the slide W (or W'), and the other to the slide $h$, sliding in the horizontal plane of the crosspiece C. This connection is effected by means of four connecting rods $t$ and $t'$ which are equal for each of the levers.

The arrangement of the parts described is such that if pivots 8 and 8' are at 45° on the straight lines K and K' respectively, and therefore bisecting the two angles formed by the Cartesian axes, they remain on the said bisectrices, no matter how the director rod D is moved.

A simpler construction of the apparatus is illustrated in outline form in FIG. 8.

On support 3', for instance, is pivoted director lever 28, which is guided by bushing 29, pivoted in turn on F°, which is fixed at $f$ distance from O. Pivot 27, on which director lever 28 is pivoted, is located precisely on the abscissa passing through O, and on one of the conjugated planes through its axis. The other conjugated plane passing through 8 is restrained as shown in FIG. 3, but can also be restrained as shown in FIG. 5, or by means of the double-pulley arrangement as shown in FIG. 8, where the double restraint is shown for purposes of illustration.

The adaptation of the apparatus to the shooting of live scenes involves no modification in the kinematics described, because all that is required is to bring the scene to the object plane of the apparatus, the same as it is done with any figure to be reproduced.

This possibility is offered by the fact that, if two converging optical systems (e.g. two lenses) have their optical axes in common and their nodal points are spaced more than the sum of their focal lengths apart, the real image which one of the lenses can give is reproduced by the other, but reversed.

It is easily understood that, if a lens of appropriate focal length gives the image of the scene in Q, the lens of the apparatus positioned between two conjugated planes reproduces such image, enlarged or reduced, on the plane P (FIG. 7).

Since the image in Q is reversed and that in P is therefore straight, all that needs to be done is to run the film in the opposite direction so that it can be projected.

The embodiments described here for purposes of exemplification may be obtained by different mechanical solutions which, by embodying the same inventive concept, achieve the same or similar results, and therefore fall within the scope of protection of the invention, as defined by the following claims.

What I claim is:

1. In a focussing device reproducing the analytical function of the conjugate-foci straight line equation $$\frac{f}{x}+\frac{f}{x'}=1$$

on a Cartesian plane of coordinates, said device comprising a support shaft representing the ordinate of said coordinate system, guide means representing the abscissa of said coordinate system, said shaft and said guide means intersecting each other at the origin of said coordinate system, fulcrum supporting means carried by said support shaft, a fulcrum carried by said fulcrum supporting means, means slidably mounted upon said guide means, other guide means carried by the last-mentioned means, a director rod pivoted about said fulcrum, and swingable and slidable elements operatively connecting said director rod with said other guide means.

2. A device in accord with claim 1, comprising, an inclined guide means only on one side of the support shaft while the pivot on the other side is fixed directly to the horizontal sliding means with its center exactly on the abscissa along which it slides together with its supporting means, said support shaft pivot being stopped at a distance $f$ from the origin, whereby the same result as in the claim 1 is obtained.

3. A device in accord with claim 2, in which the inclined guide means are replaced by any known mechanism such that the pivots move at equal distances from the abscissa and the ordinate.

4. A device in accord with claim 2, comprising, a suitable lens system combined with the lens system belonging to the device, whereby setting a suitable lens system on the object side an image is formed on the object plane and by setting a motion picture camera with its feeding film plane lying on the image plane and by varying the conjugate-foci the image formed on the object plane is gradually reduced or enlarged on the image plane, without moving the motion picture camera from its position.

5. A device in accord with claim 1 in which the inclined guide means are replaced by any known mechanism such that the pivots move at equal distances from the abscissa and the ordinate.

6. A device in accord with claim 5, comprising, bell-crank levers fulcrumed on the sliding means, having their two arms of equal length, connecting rods of equal length connecting one arm with the pivots and the other arm with the vertical shaft slot means, whereby however the levers rotate, the distance the pivots move normal to the abscissa are equal to the distance the sliding means move normal to the ordinate, wherein the fulcrum of the levers are mounted in such a manner that the pivots must move at any instant at equal distance from the abscissa and the ordinate.

7. A device in accord with claim 6, comprising, a suitable lens system combined with the lens system belonging to the device, whereby setting a suitable lens system on the object side an image is formed on the object plane and by setting a motion picture camera with its feeding film plane lying on the image plane and by varying the conjugate-foci the image fomed on the object plane is gradually reduced or enlarged on the image plane, without moving the motion picture camera from its position.

8. In a focussing device, a frame, two alined guide rods carried by said frame, a separate support mounted upon each guide rod, a support shaft carried by said frame and extending perpendicularly to said guide rods, said guide rods being located on opposite sides of said support shaft, a guide slidable upon said support shaft, a pivot carried by said guide, two other guides, each of the last-mentioned guides being firmly connected to a separate support and extending perpendicularly to said guide rods and parallel to said support shaft, two further guides connected to said frame, one of said further guides extending at angles of 45° between one of said guide rods and said support shaft from the point of intersection of said one guide rod and said support shaft, the other one of said further guides extending at angles of 45° between the other one of said guide rods and said support shaft from the point of intersection of said other guide rod and said support shaft, a director rod swingably mounted intermediate its ends upon said pivot, and tubular sliding elements on each side of said pivot slidable upon said other guides and said further guides and pivotally engaging said director rod, whereby movement of said supports along said guide rods causes a swinging movement of said director rod, whereby a lens system remains focused during the variations in the distance between the object plane and the image plane.

References Cited in the file of this patent

UNITED STATES PATENTS

| | | |
|---|---|---|
| 730,583 | Stender | June 9, 1903 |
| 1,029,295 | Holst | June 11, 1912 |
| 1,126,352 | Becker | Jan. 26, 1915 |
| 1,174,547 | Clason | Mar. 7, 1916 |
| 1,266,111 | Evans et al. | Mar. 14, 1918 |
| 1,280,638 | Becker | Oct. 8, 1918 |
| 1,301,897 | Becker | Apr. 29, 1919 |
| 1,399,347 | Jobke | Dec. 6, 1921 |

FOREIGN PATENTS

| | | |
|---|---|---|
| 506,822 | Great Britain | Aug. 30, 1937 |